(12) United States Patent
Richards (10) Patent No.: US 8,783,704 B2
(45) Date of Patent: Jul. 22, 2014

(54) SUSPENSION SYSTEM (76) Inventor: Dennis P. Richards, Lancaster, NY (US)

( * ) Notice: Subject to any disclaimer, the term of this patent is extended or adjusted under 35 U.S.C. 154(b) by 70 days.

(21) Appl. No.: 13/613,571

(22) Filed: Sep. 13, 2012

(65) Prior Publication Data

US 2014/0070516 A1    Mar. 13, 2014

(51) Int. Cl.
*B62K 21/02* (2006.01)
*B62K 25/08* (2006.01)
*B62K 25/04* (2006.01)

(52) U.S. Cl.
CPC .............. *B62K 25/08* (2013.01); *B62K 25/04* (2013.01)
USPC .......................................... 280/276; 280/275

(58) Field of Classification Search
CPC ........ B62K 25/08; B62K 25/04; B62K 25/16; B62K 25/12
USPC .................................. 280/276, 275
See application file for complete search history.

(56) References Cited

U.S. PATENT DOCUMENTS

| | | | |
|---|---|---|---|
| 4,189,168 A | 2/1980 | Courtney | |
| 4,212,481 A | 7/1980 | Ribi | |
| 4,379,567 A * | 4/1983 | Ribi | 280/276 |
| 4,401,316 A | 8/1983 | Miyakoshi et al. | |
| 4,410,196 A | 10/1983 | Ribi | |
| 4,533,153 A * | 8/1985 | Tsunoda et al. | 280/277 |
| 4,542,910 A * | 9/1985 | Watanabe | 280/276 |
| 4,775,163 A | 10/1988 | McGowan et al. | |
| 5,226,674 A | 7/1993 | Buell et al. | |
| 6,036,211 A * | 3/2000 | Nohr | 280/276 |
| 6,488,300 B2 * | 12/2002 | Ito et al. | 280/276 |
| 6,994,365 B2 * | 2/2006 | Kofuji | 280/277 |
| 7,887,077 B2 * | 2/2011 | Thiers | 280/276 |
| 7,896,379 B2 | 3/2011 | Nagao et al. | |
| 2007/0209855 A1 | 9/2007 | Burkiewicz | |
| 2010/0109282 A1 | 5/2010 | Weagle | |
| 2011/0175318 A1 | 7/2011 | Rae | |

FOREIGN PATENT DOCUMENTS

JP    2011201335    10/2011

* cited by examiner

*Primary Examiner* — Kevin Hurley
*Assistant Examiner* — Michael Stabley
(74) *Attorney, Agent, or Firm* — Simpson & Simpson, PLLC (57) ABSTRACT

The invention broadly includes a suspension system for a vehicle that includes a vehicle frame, at least one pair of shock absorbers attached to the frame and having piston stems extending from the shock absorbers and attached to extension arms pivotally attached to the frame. The extension arms are attached to the tire axles optionally attached to support arms. The support arms are also attached to the pivot connection. The pivot connection is between the axle and the shock absorber.

18 Claims, 9 Drawing Sheets

SUSPENSION SYSTEM

FIELD OF THE INVENTION

The field of the invention relates generally to suspension systems, more particularly to vehicle suspension systems, and still more particularly to systems with particular locations for shock absorbers within a suspension system

BACKGROUND OF THE INVENTION

Vehicle suspension systems are designed to enable the vehicle to ride smoothly and to allow the driver to keep the vehicle under control on bumpy, rough, and hazardous roads and trails. Suspension systems are used in such diverse vehicles as automobiles, motorcycles, four-wheel all-terrain vehicles, trucks, etc.

The suspension systems are attached to the vehicle frame and affect the ride of the vehicle by mitigating the effects of rough roads and trails on the frame. No matter what type of vehicle is used, one challenge to suspension systems is to prevent the vehicle from bouncing too high when it travels over large bumps or emerges from a dip or depression in the road or trail. One problem with current suspension systems is that shock absorbers in the suspension system absorb upward movement from bumps thereby pushing the vehicle upward significantly before the passive pull of gravity brings the vehicle back down toward the road. This can create a safety issue especially with two wheel vehicles such as motorcycles as the relatively light weight of motorcycles allows a greater upward movement to the point of creating a situation in which the motorcycle is airborne.

U.S. Pat. No. 5,226,674 to Buell, et al. discloses a suspension system for a bicycle or motorcycle that includes a single shock absorber attached to the vehicle frame. Although it acts on the rear wheel, it has no effect on the front wheel of the vehicle and no stability for the steering column of the machine. Additionally, Buell, et al., teach the use of multiple pivot axes. U.S. Pat. No. 7,896,379 to Nagao, et al. discloses a front suspension system in which the single shock absorber is pivotally attached to the motorcycle frame. This configuration will cause the vehicle to move upward significantly before gravity pulls the frame downwardly. U.S. Pat. No. 4,189,168 to Courtney relates a wheel suspension system that includes only a single shock absorber on each of the front and back wheels with no immediate direct downward pull by the shock absorber on the front of the frame.

Thus, it can be seen that the field lacks a suspension system that provides a direct active downward movement on a vehicle frame and also provides more than one shock absorber for the wheels of two wheeled vehicles that still provide a direct downward movement on the frame of the two wheeled vehicles utilizing a single pivot axis.

SUMMARY OF THE INVENTION

The present invention broadly comprises a shock absorbing suspension for a vehicle including a vehicle frame having a front end, a rear end, and opposing sides; at least one pair of shock absorbers each of the pair of shock absorbers having a piston and piston stem extending from the piston and through the shock absorber so that each of the pair of shock absorbers is functionally attached to the frame; at least one axle; at least two extension arms each of the extension arms pivotally attached to the frame and having a first and a second end so that the first end is attached to the piston stem of one of the shock absorbers, the second end is attached to one of the axles, and the pivotal attachment is between the first end and the second end; and, at least one pair of support arms, each support arm having a first end and a second end, such that the first end of the support arm is pivotally attached to the pivotal connection and attached to the extension arm and at least one axle is rotatably mounted on or proximate to the second support arm end.

The present invention also comprises a motorcycle with a shock absorbing system for a vehicle, the shock absorbing system including a frame for the motorcycle having a front end, a rear end, and opposing sides; at least one pair of shock absorbers, each of the pair of shock absorbers attached to the frame having a piston and piston stem extending from the piston through the shock absorber; a pair of axles; and at least two pair of extension arms each of the extension arms pivotally attached to the pivotal connection and having a first and a second extension arm end, wherein the first end is attached to the piston stem of one of the shock absorbers, the second end is attached to one of the pair of axles, and the pivotal attachment of each of the extension arms is between the first end and the second end.

One object of the present invention is to provide a suspension system in which the result of an upward force on a vehicle wheel or tire is to force the vehicle frame downward toward a road or trail.

A second object of the present invention is to supply a suspension system that may be used in both the front end and rear end of a vehicle frame.

A third object of the present invention is to disclose a suspension system in which the steering column of a motorcycle is pulled toward the road when the steering column is subject to upward force.

BRIEF DESCRIPTION OF THE SEVERAL VIEWS OF THE DRAWINGS

The nature and mode of the operation of the present invention will now be more fully described in the following detailed description of the invention taken with the accompanying drawing Figures, in which.

DETAILED DESCRIPTION OF EMBODIMENTS OF THE INVENTION

At the outset, it should be appreciated that like drawing numbers on different drawing views identify identical structural elements of the invention. It also should be appreciated that figure proportions and angles are not always to scale in order to clearly portray the attributes of the present invention.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims. Although any methods, devices or materials similar or equivalent to those described herein can be used in the practice or testing of the invention, the preferred methods, devices, and materials are now described.

Figure 1:
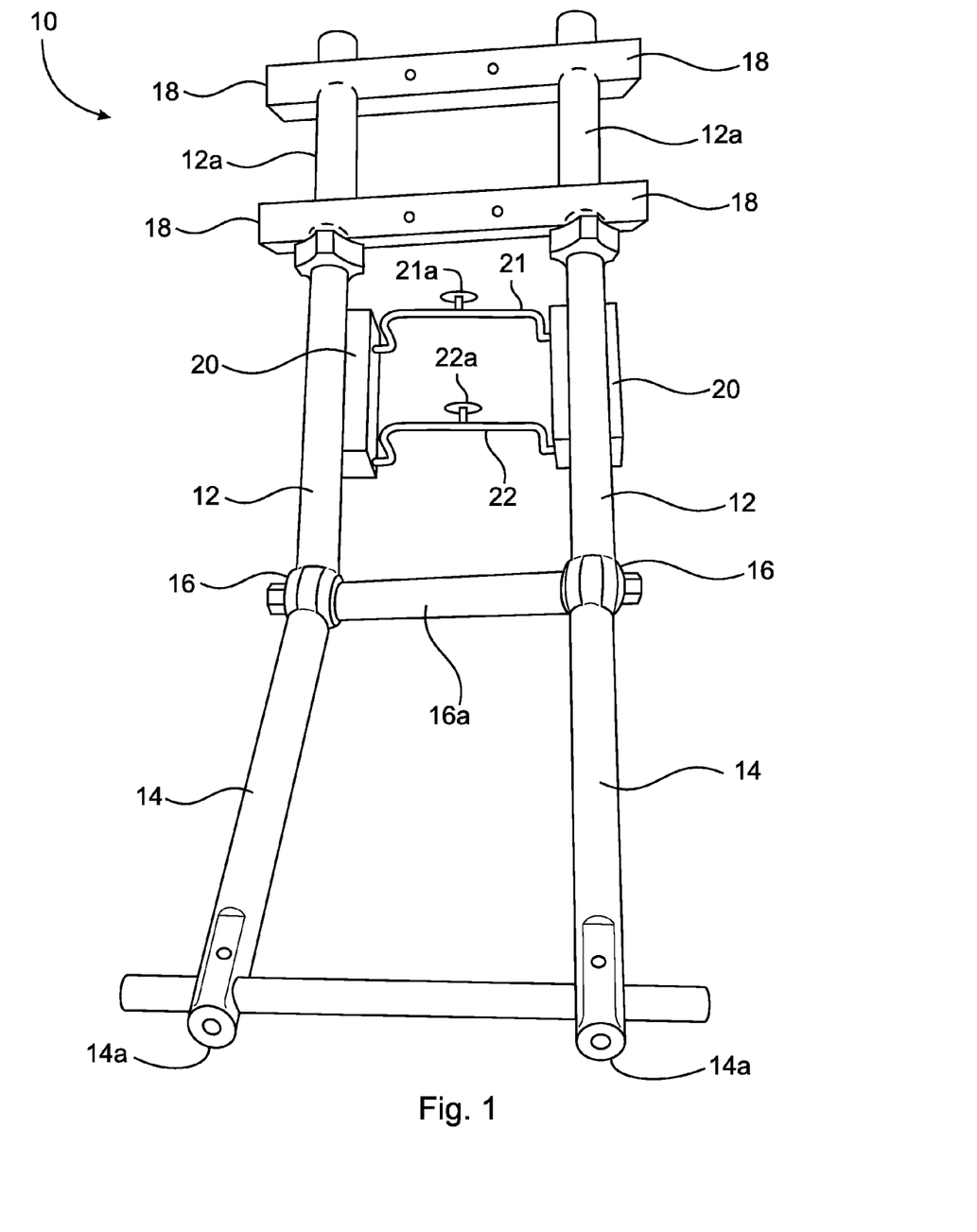
FIG. 1 is a front view of the shock absorbing system of the present invention.

Adverting to the drawings, FIG. 1 is a front view of the shock absorbing system 10 ("system 10") of the present invention. Although it is intended that system 10 can be used on vehicles having any number of wheels, the description below primarily describes the use of system 10 with a motorcycle. Included are a pair of upper forks 12 pivotally attached to extension arms 14 at rotatable pivot connection 16. Pivot connections 16 may be connected by pivot rod 16a. Extension arms 14 receive axle 15 proximate to axle end 14a.

Also seen are a pair of shock absorbers 20 with one of the pairs located under each of the upper forks 12. Preferably, shock absorbers 20 are gas shock absorbers of a type well known to those having skill in the art. More preferably, the gas may be either air or nitrogen. Upper gas line 21 and lower gas line 22 extend between the pair of shock absorbers 20. Also seen are upper gas gauge 21a in gas line 21 and lower gas gauge 22a in gas line 22. Upper fork extensions 12a act to connect system 10 to a motorcycle frame. Cross pieces 18 provide lateral support for upper forks 12a and may also be used to connect the motorcycle frame to system 10 either directly or through a separate component as discussed below.

Figure 2:
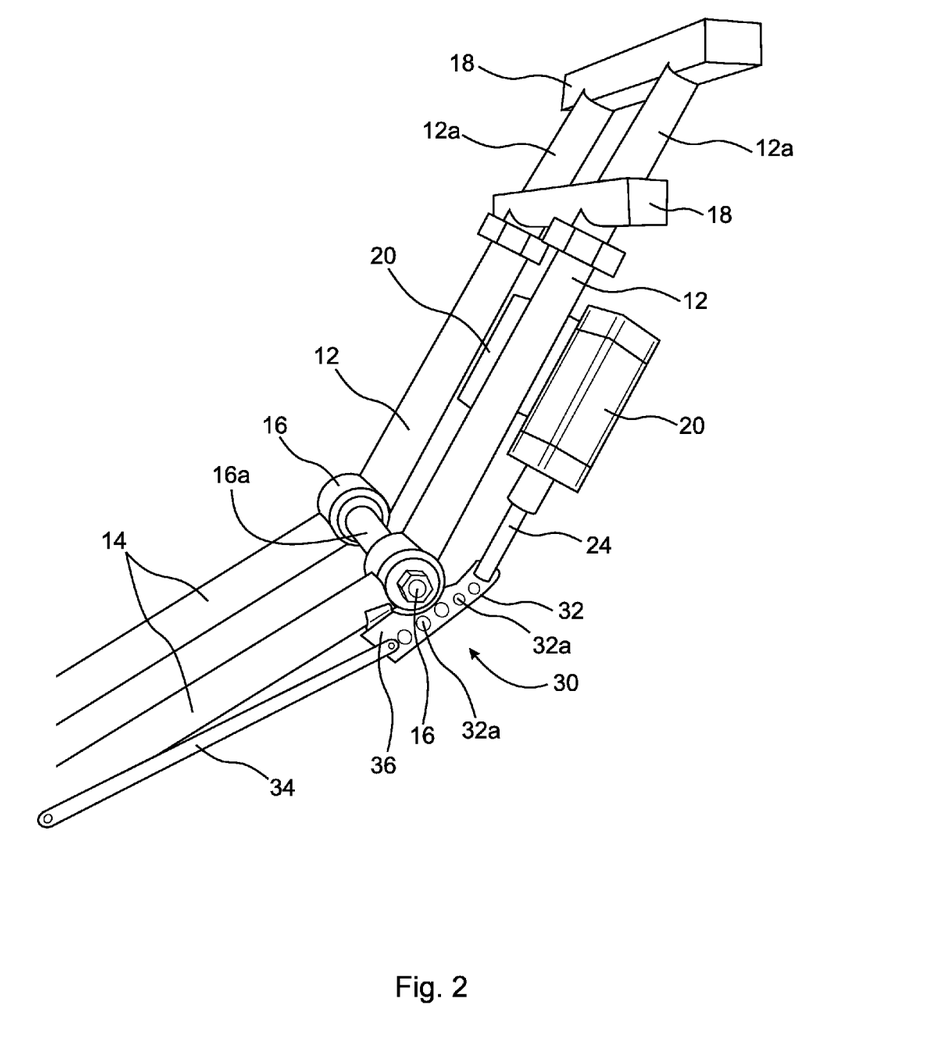
FIG. 2 is a side view of the shock absorbing system depicting one of the pair of extension arms attached to the pivot connection between the upper and lower forks of the system.

FIG. 2 is a side view of system 10 showing one of a pair of support arms 34 ("arm 34") rotatably attached to pivot connection 16. Piston stem 24 extends from the piston (not shown) internal to shock absorber 20 and is movably attached to support arm assembly 30 at rotating attachment means 32 above pivot connection 16. In the embodiment shown, rotating attachment means 32 is multilink 32 having a plurality of connection points 32a. Persons of skill in the art will recognized that other forms and configurations of rotating attachment means 32 may be used.

Figure 3:
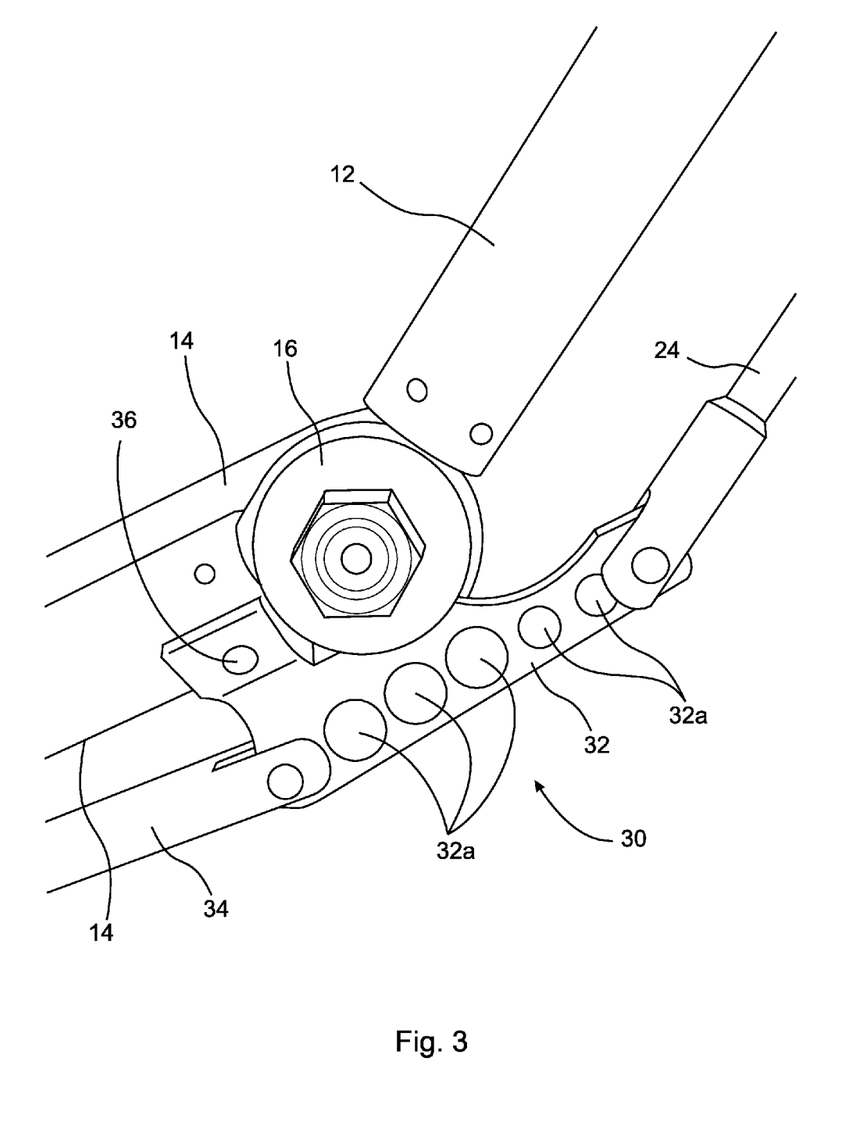
FIG. 3 is an enlarged side view of the pivotal connection showing the attachment of the piston stem to the multilink as well as the attachment of the multilink to the extension arm and the support arm.

Multilink 32 is attached to extension arm 14 proximate to pivotal connection 16 to form a pivotal connection. Preferably the attachment point 36 on multilink 32 is integral with the body of multilink 32. Support arm 34 has a first end attached to multilink 32 to form a pivotal attachment with pivot connection 16 and a second end attached to extension arm 14. FIG. 3 is an enlarged side view of pivotal connection 16 showing the attachment of piston stem 24 to multilink 32 as well as the attachment of multilink 32 to extension arm 14.

Figure 4:
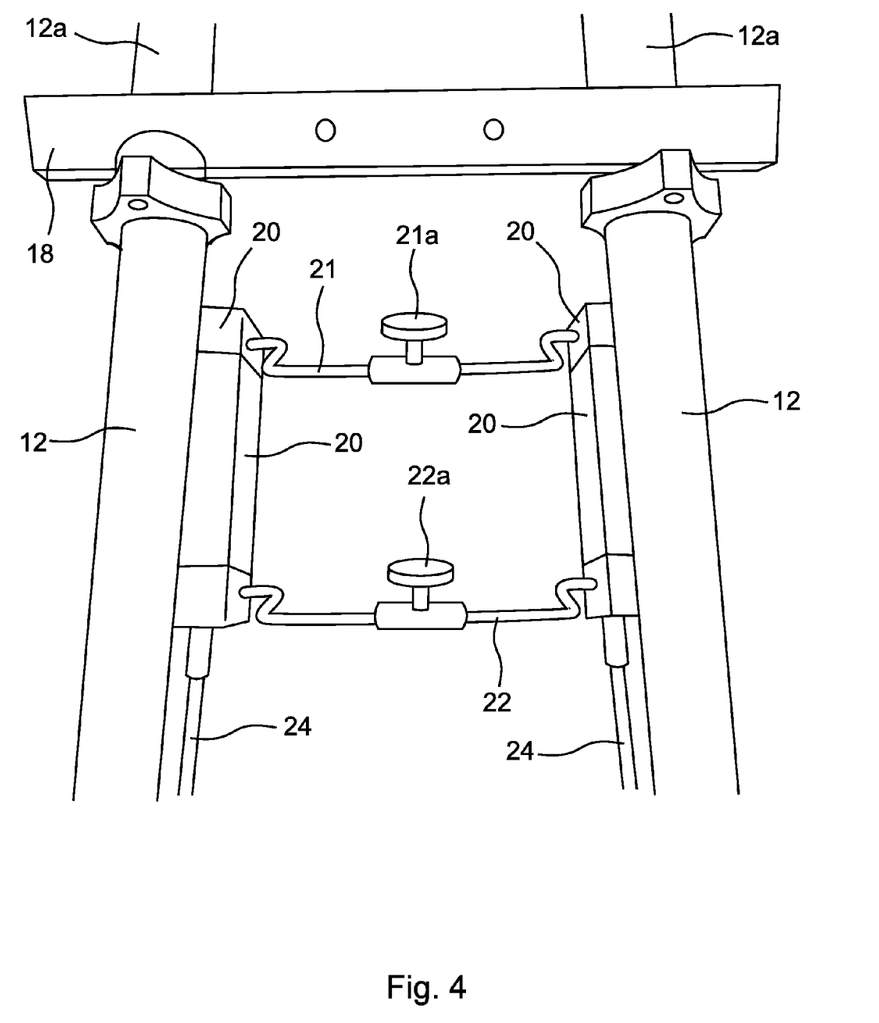
FIG. 4 is a front enlarged view of the dual shock absorbers of the shock absorbing system.

FIG. 4 is a front enlarged view of the dual shock absorbers 20 of system 10. It can be clearly seen that upper gas line 21 is connected to shock absorbers 20 proximate their upper ends above the internal piston, while gas line 22 is connected to shock absorbers 20 proximate their lower ends below the internal piston. Piston stems 24 can be seen extending toward support arm assembly 30 as described above. It will be recognized that the respective upper and lower ends are filled with gas.

Figure 5:
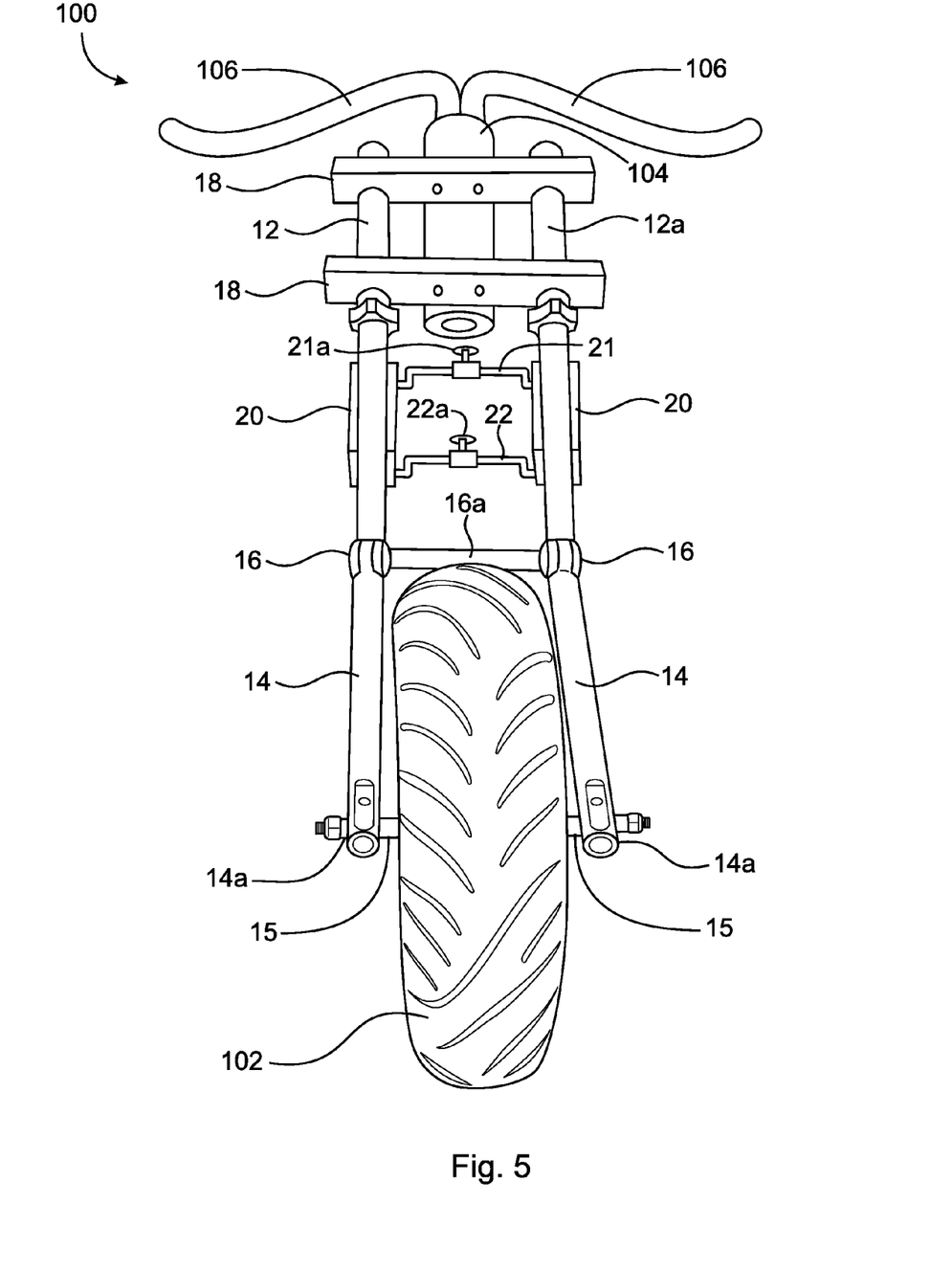
FIG. 5 is a front view of the suspension system with a front motorcycle tire rotatably mounted on the front axle.

FIG. 5 is a front view with a front tire attached to a motorcycle 100. Tire 102 is seen in rotational attachment with axle 15 in a known manner. Steering column 104 ("column 104") is functionally attached the frame and to cross pieces 18 with handlebars 106 extending from steering column 104. It will be recognized that column 104 may be attached to cross piece(s) 18 through, for example, welding, soldering, or by passing through guide holes defined by cross pieces 18. "Functional attachment" is intended to mean that the attachment between steering column 104 and cross piece(s) 18 enables the function of steering control by handlebars 106, which are attached to column 104, over suspension system 10 and the frame enabling a user to turn suspension system 10 and thus steer the frame. The functional attachment may be direct or indirect through another component such as crosspieces 18. In this regard, upper forks 12/12a may act as part of the frame of motorcycle 100 through their attachment to steering column 104 through crosspieces 18. In alternate embodiments, crosspieces 18 may not be used to connect upper forks 12/12a to steering column or other connecting components may be used.

Figure 6:
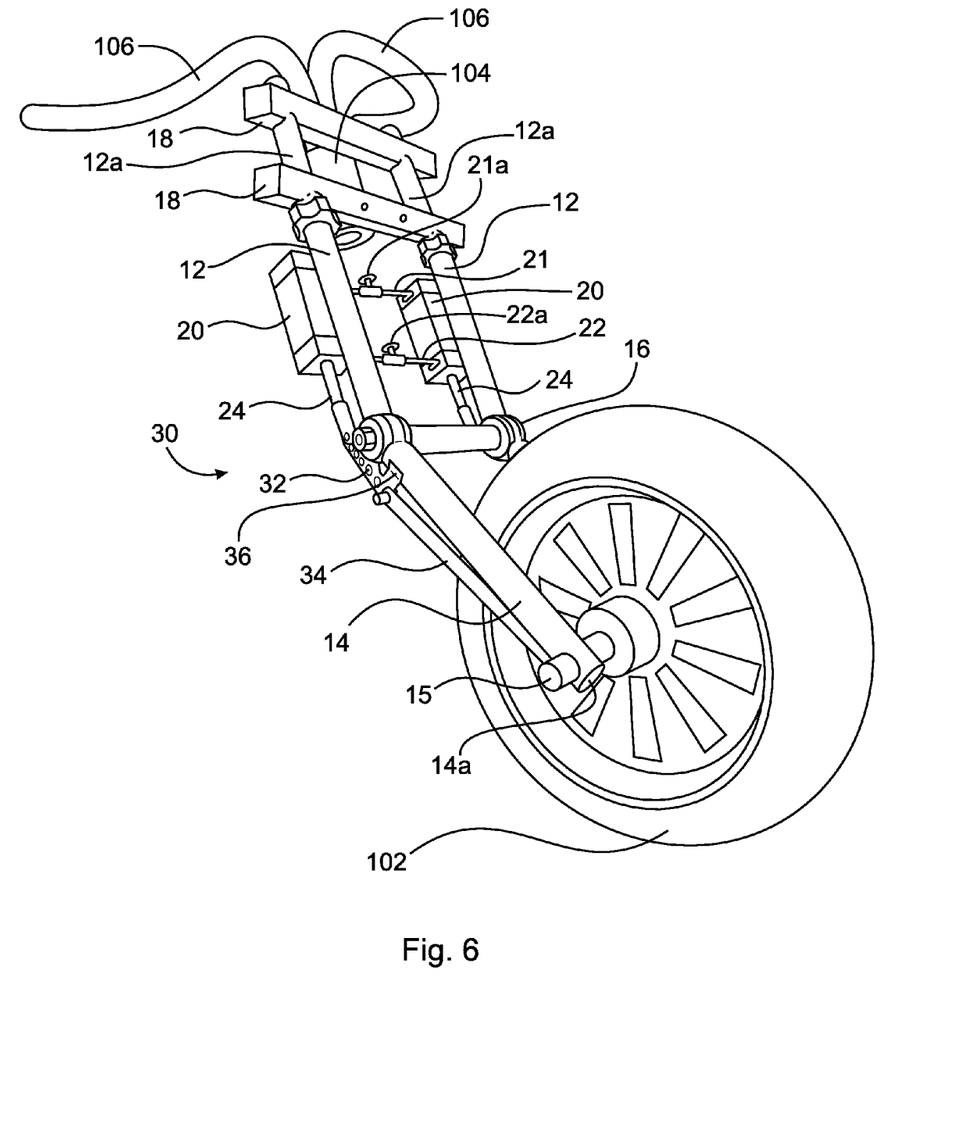
FIG. 6 is a side perspective view of the motorcycle depicting the support arm of the shock absorbing system.
Figure 7:
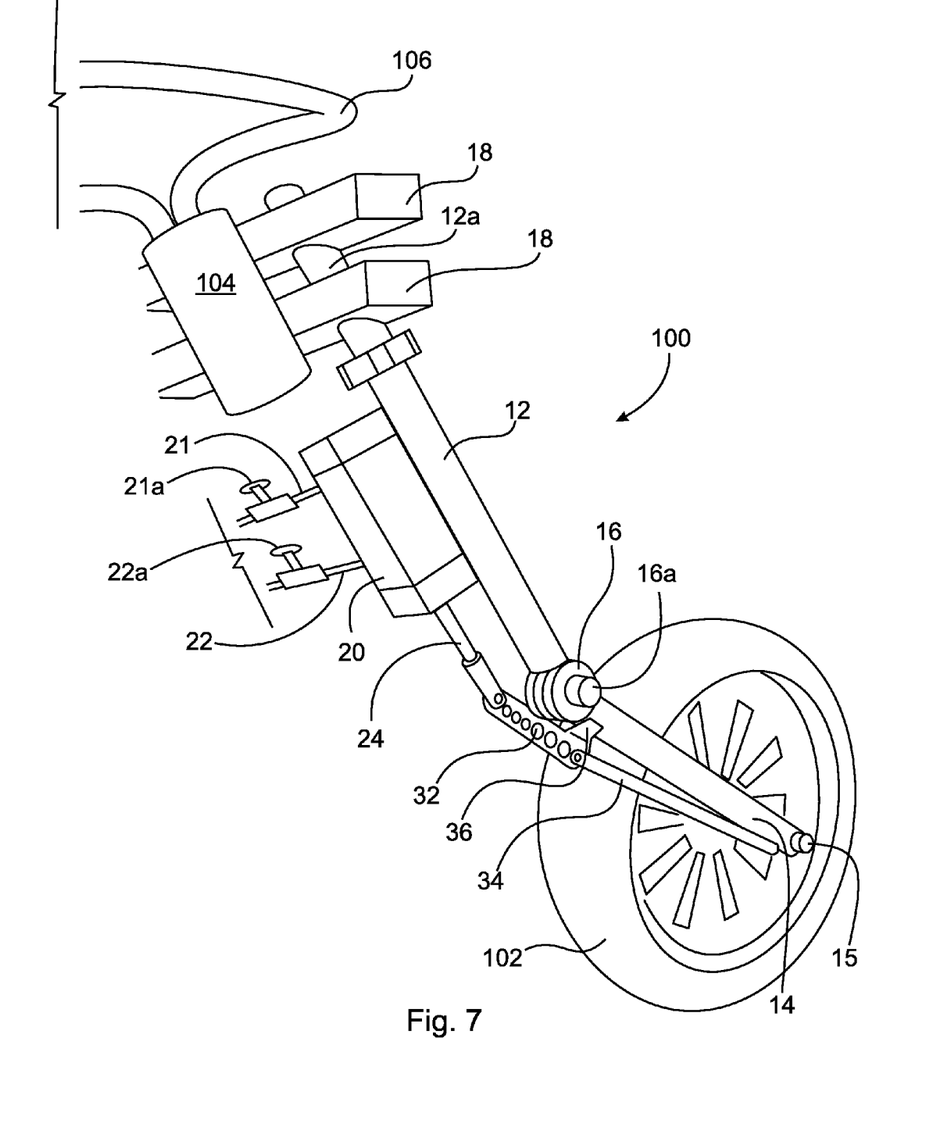
FIG. 7 is a rear perspective view showing the multilink of the extension arm connecting the piston stem of the shock absorber to the pivotal connection and the support arm.

FIG. 6 is a side perspective view of motorcycle 100 depicting support arm assembly 30. It can be seen that attachment of system 10 to column 104 allows system 10 to be rotated left or right with pivot connection 16 kept in place between axle 15 and shock absorbers 20 even with the rotation of system 10. FIG. 7 is a rear perspective view showing multilink 32 connected to pivotal connection 16 and extension arm 14 at attachment point 36. Persons of skill in the art will recognize that system 10 may be adapted for use on the rear axle of motorcycle 100 by placing shock absorbers between the frame and the pivot connection as described below.

Figure 8:
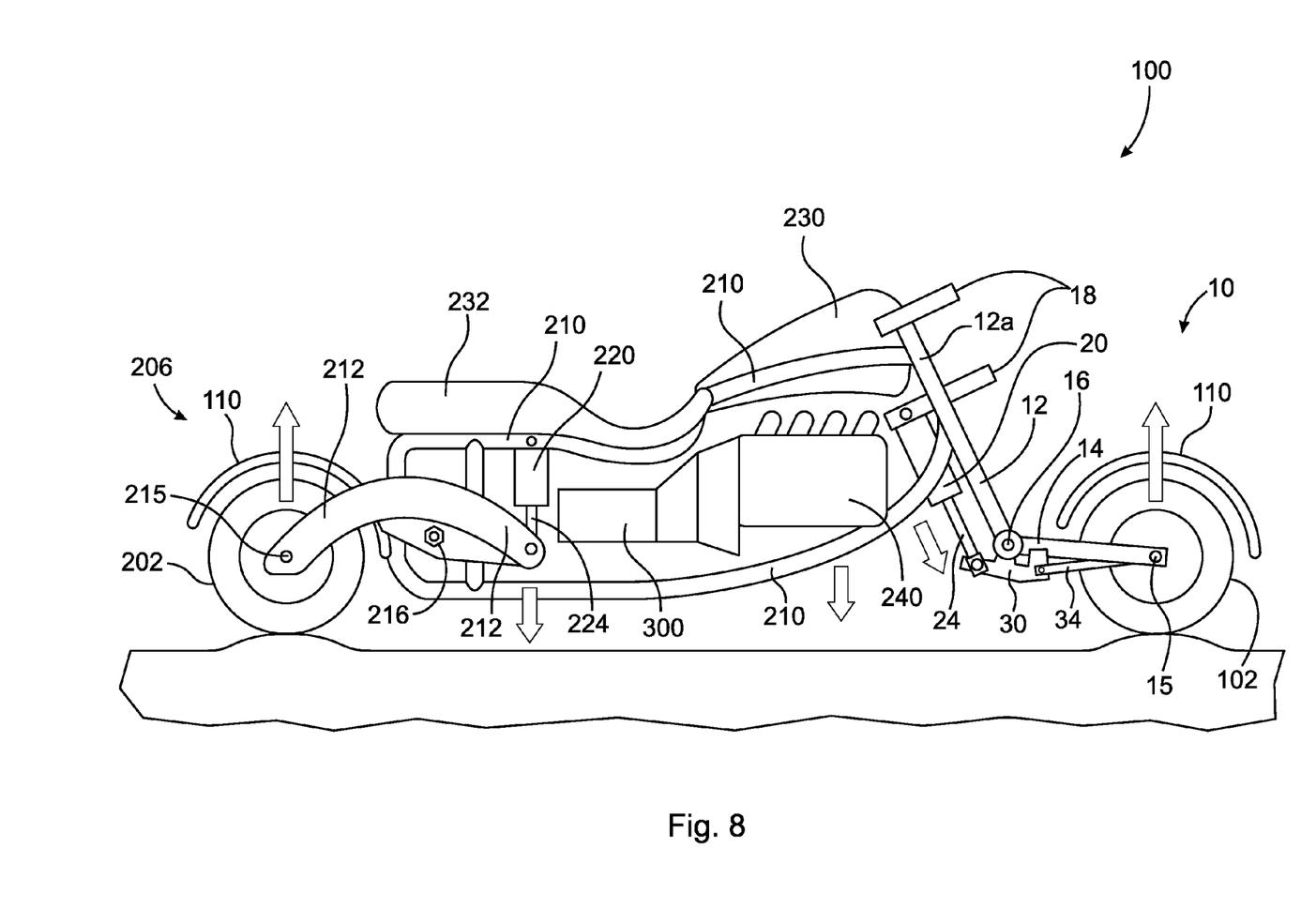
FIG. 8 is a schematic side view of the motorcycle showing the suspension system of the present invention utilized on both the front and rear wheels; and, FIG. 9 is a schematic view of the suspension system of the present invention as applied to a vehicle, e.g., an automobile, truck, or other three or four wheeled vehicle, in which the tires are on separate axles on opposite sides of the vehicle.

FIG. 8 is a schematic side view of motorcycle 100 showing the suspension system of the present invention utilized on both the front and rear wheels. Motor 240 is positioned toward front tire 102 under fuel tank 230. Transmission 300 is behind motor 200 under seat 232. Frame 210 supports seat 232, motor 200, transmission 300, and fuel tank 230 in a manner known to those having skill in the art. In addition, frame 210 is supported by front suspension system 10 and rear suspension system 200. Rear shock absorber 220, preferably a gas shock absorber similar to shock absorber 20 and using nitrogen, compressed air or other suitable gas, is attached to frame 210 at a first end and to one end of rear extension arm 212 through piston stem 224 at a second end of shock absorber 220. Extension arm 212 is pivotally attached to frame 210 at pivot connection 216. The opposing end of extension arm 212 is attached to rear axle 215 which supports rear tire 202. Fenders 110 protect tires 102 and 202, respectively.

It can be seen that rear suspension 200 operates similarly to front suspension 10. In both suspensions, if tires 102 and/or 202 travel over a bump, that tire is forced upward as signified by the arrows. It is evident that the attachment points between front extension arm 14 and front axle 15 and rear extension arm 212 and rear axle 215 are forced up along with tires 102 and 202, respectively. In each instance piston stems 24 and 224 are pulled down causing respective shock absorbers 20 and 220 to pull frame 210 down. Thus, suspensions 10 and 200 provide motorcycle 100 with a more stable ride as they both actively pull frame 210 down rather than relying on the passive action of gravity to overcome the upward momentum of the force on frame 210 caused by the bump(s). It will be recognized that, like front suspension 10, the same structure of rear suspension 200 supports motorcycle 100 on both sides of tire 202.

Figure 9:
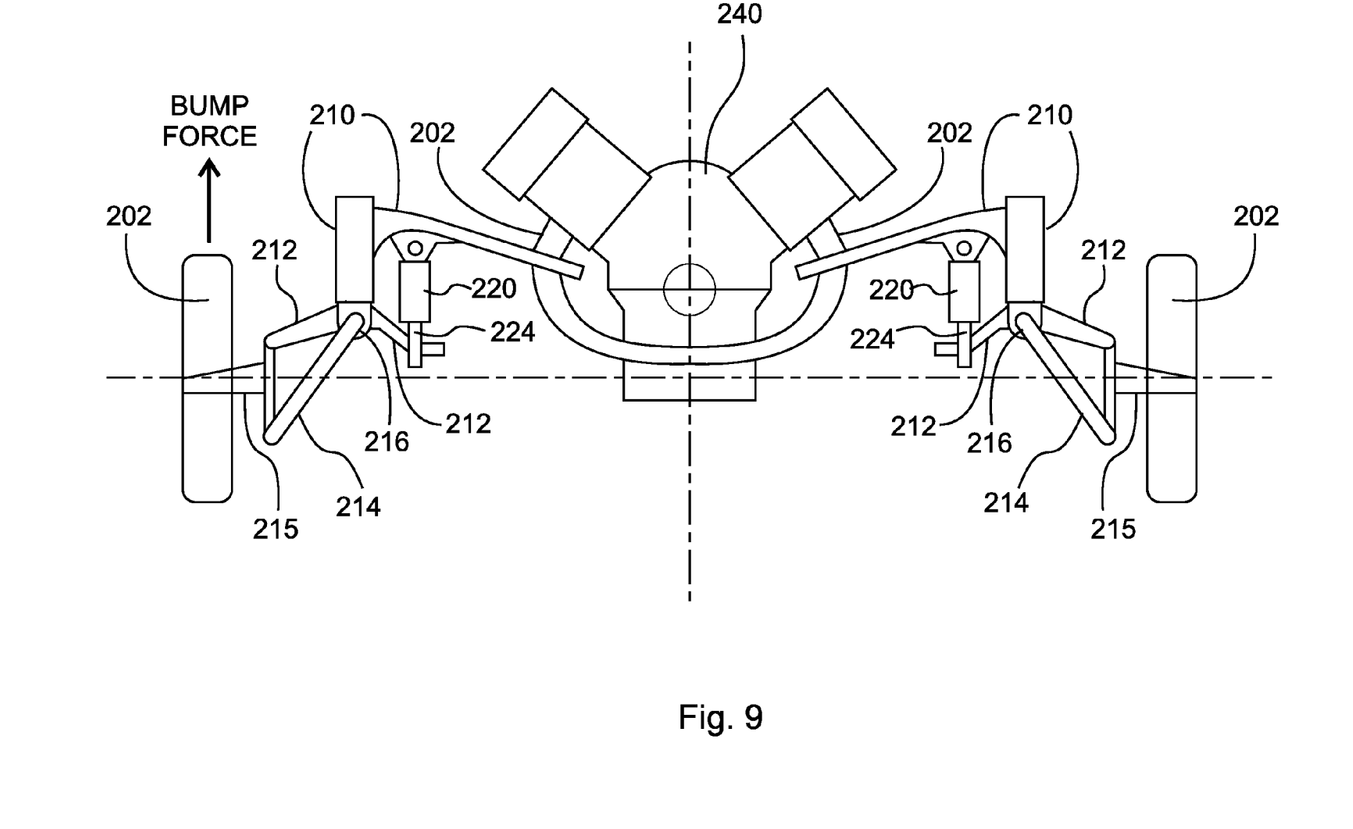

FIG. 9 is a schematic view of suspension system 10 as applied to a vehicle powered by engine or motor 200 in which tires 202 are on separate axles 215 on opposite sides of vehicle 200. It should be appreciated that the vehicle depicted in FIG. 9 may be a two wheeled vehicle or four or more wheeled vehicle such as a car, truck, tractor trailer, etc. Persons of skill in the art will recognize that system 200 may be used on either or both of the front and rear suspensions of the vehicle. Engine or motor 240 is supported by motor mounts 202 on vehicle frame 210. Piston-type shock absorbers 220 are attached to frame 210 with piston stem 224 attached to extension arm 212. Extension arm 212 is attached to frame 210 at pivot connection 216 in such a way as to allow the two ends of extension arm 212 to extend to either side of pivot connection 216. Extension arm 212 and support arm 214 are pivotally connected at pivot connection 216 which acts as a pivot point. In the embodiment shown in FIG. 9, pivot connection 216 is located between the attachment of shock absorber 220 to frame 210 and axle 215. Extension arm 212 is preferably one integral unit pivotally connected at pivot connection 216.

Shock absorbers 220 are attached to frame 210 between motor 200, which is centrally located on the vehicle, and pivot connection 216. When tire 202 rolls over a bump, bump force is applied upwardly to tire 202 and axle 215 in the direction of the arrow. This upward bump force causes the outside end (closest to axle) of extension arm 212 and support 214 to rotate up with attached axle 215. The upward motion outside pivot connection 216 causes a downward pulling of the opposite inside end of extension arm 212 inside the pivot connection resulting in pulling piston stem 224 down. The downward pull on stem 224 and the consequent downward pull on shock absorber 220 results in an active downward force applied to frame 210 and the vehicle.

Similarly, in motorcycle 100, upward force on tire 102 will force axle 15 upwards as well. Extension arms 14 rotate up at pivot connection 16. Simultaneously, support arms 34, attached to extension arms 14, rotate up thereby pulling piston stems 24 and the internal piston down toward the ground or road. This downward force is actively transferred to the vehicle frame by shock absorbers 20 which are attached to the frame through upper arms 12 and steering column 104.

In a preferred embodiment, shock absorbers 20 and 220 are gas shock absorbers using either air, nitrogen, or other suitable gas. By the term "air" is meant atmospheric air as is found in the earth's atmosphere with an approximate of composition of 78% nitrogen, 20% oxygen, and approximately 2% trace elements. In the configuration shown in FIGS. 1, 4, and 5 gas lines 21 and 22 extend between paired shock absorbers 20. The outlets for each gas line extend below the upper and lower range of movement of the shock absorber piston creating compression of the gas as the pistons move. When the piston is pulled down by the upward movement of the support arms 14 and axle 15, the gas pressure in the lower end of the piston and gas line 22 increases causing a rebound effect that urges support arms 14 down to reinforce the pulling force applied to the frame by the initial pull on shock absorbers 20. The use of a pair of shock absorbers 20 provides greater initial downward force than with a single shock absorber while gas lines 21 and 22 provide the further advantage of equalizing the gas pressure and thus the force on both sides of motorcycle 100. However, if gas lines 21 and 22 are removed, gas shock absorbers 20 and 220 will act in a similar manner.

In each of the suspension systems described above, the gas shock absorbers are attached directly or indirectly to the vehicle frame, with the piston stem attached to an extension arm at such a point that the pivot connection is between the piston stem connection and the axle. This is seen in FIG. 2 in front suspension system 10 in which piston stem 24 is attached to multilink 30 so that pivot connection 16 is between the piston stem connection 24 attachment to multilink 32 and axle 15. This is also seen in FIGS. 8 and 9 depicting rear suspension 200 supporting rear tire 202 of a motorcycle and a four wheel vehicle, respectively. FIGS. 4 and 8 also shows the indirect attachment of shock absorbers 20 to frame 210 through upper supports 12 which are attached to frame 210 through steering column 104. This indirect attachment provides the active downward pull from shock absorbers 20 to the frame.

Thus it is seen that the objects of the invention are efficiently obtained, although changes and modifications to the invention should be readily apparent to those having ordinary skill in the art, which changes would not depart from the spirit and scope of the invention as claimed.

I claim:

1. A shock absorbing suspension system for a vehicle comprising:
   a vehicle frame having a front end, a rear end, and opposing sides;
   at least one pair of gas shock absorbers, each one of said pair of gas shock absorbers having a piston and a piston stem extending from said piston and through said gas shock absorber wherein each of said pair of gas shock absorbers is functionally attached to said frame;
   at least one axle, wherein at least one tire is rotatably attached to each of said at least one axle;
   at least two extension arms, each one of said at least two extension arms pivotally attached to said frame forming a pivotal connection and having a first end and a second end, wherein said each of said extension arm first ends is attached to said piston stem of one of said at least one pair of gas shock absorbers, said second extension arm end is attached to one of said at least one axle, wherein said pivotal connection is between said first extension arm end and said second extension arm end;
   a steering column attached to said frame;
   a pair of upper forks, each upper fork of said pair of upper forks having a first end and a second end wherein each of said upper fork first ends is attached to said steering column and each of said upper fork second ends is attached to said pivotal connection; wherein one gas shock absorber of one pair of said at least one pair of gas shock absorbers is attached to one of said pair of upper forks; and, wherein said pair of upper forks and said steering column form a functional attachment of each said one gas shock absorber of said one pair of said at least one pair of gas shock absorbers to said frame.

2. The shock absorbing suspension system as recited in claim 1 further comprising at least one pair of support arms, each support arm having a first end and a second end, wherein said first support arm end is pivotally attached to said pivotal connection and attached to said extension arm.

3. The shock absorbing suspension system as recited in claim 2 wherein said attachment of each of said extension arm first ends to one of said pair of piston stems is replaced by an attachment of each of said support arm first ends to one of said pair of piston stems.

4. The shock absorbing suspension system for a vehicle as recited in claim 1 wherein said suspension system includes at least two pairs of said gas shock absorbers and at least two pairs of said extension arms.

5. The shock absorbing system as recited in claim 1 wherein each of at least one said pair of gas shock absorbers is an air shock absorber.

6. The shock absorbing system as recited in claim 1 wherein each of said pair of gas shock absorbers is a nitrogen shock absorber.

7. The shock absorbing system as recited in claim 1 wherein a gas pressure increases below said pistons when at least one of said at least two extension arms is pivoted upward.

8. The shock absorbing system as recited in claim 1 wherein a gas pressure increases above said pistons when at least one of said at least two extension arms is pivoted downward.

9. The shock absorbing system as recited in claim 1 wherein said shock absorbing suspension system is proximate to said front end of said frame.

10. The shock absorbing system as recited in claim 1 wherein said shock absorbing suspension system is proximate to said rear end of said frame.

11. A motorcycle comprising a shock absorbing system, said shock absorbing system comprising:
- a frame for a motorcycle having a front end, a rear end, and opposing sides;
- at least one pair of gas shock absorbers, each one of said at least one pair of gas shock absorbers attached to said frame and having a piston and piston stem extending from said piston through said shock absorber;
- a pair of axles;
- at least two pair of extension arms each of said extension arms pivotally attached to said frame forming a pivotal connection and having a first end and a second end, wherein each of said extension arm first ends is attached to said piston stem of one of said gas shock absorbers, each of said extension second arm ends is attached to one of said pair of axles, and said pivotal connection of each of said extension arms is between said extension arm first end and said extension arm second end; and,
- a pair of gas lines connecting said pair of gas shock absorbers, wherein a first gas line of said pair of gas lines connects one pair of said at least one pair of gas shock absorbers above said piston and a second gas line of said pair of gas lines connects said one pair of said at least one pair of gas shock absorbers below said piston.

12. The motorcycle as recited in claim 11 further comprising:
- a steering column attached to said frame proximate to said front end;
- a pair of upper forks, each of said pair of upper forks having a first end and a second end wherein each of said upper fork first ends is attached to said steering column and each of said upper fork second ends is attached to said pivotal connection; and,
- at least one pair of support arms, each support arm having a first end and a second end, wherein said support arm first end of each of said pair of support arms is pivotally attached to one of said pair of pivotal connections and said support arm second end of each of said pair of support arms is attached to one of said extension arms; and,
- wherein said attachment of each of said extension arm first ends to one of said pair of piston stems is replaced by an attachment of each of said support arm first ends to one of said pair of piston stems.

13. The motorcycle as recited in claim 11 wherein each of said pair of gas shock absorbers is an air shock absorber.

14. The motorcycle as recited in claim 11 wherein each of said pair of gas shock absorbers is a nitrogen shock absorber.

15. The motorcycle as recited in claim 11 wherein a gas pressure increases in said first gas line when at least one extension arm of said at least two pairs of extension arms is pivoted downward.

16. The motorcycle as recited in claim 11 wherein a gas pressure increases in said second gas line when at least one extension arm of said at least two pairs of extension arms is pivoted upward.

17. The motorcycle as recited in claim 11 wherein said shock absorbing system is located proximate said front end of said frame.

18. The motorcycle as recited in claim 11 wherein said shock absorbing system is located proximate said rear end of said frame.

* * * * *